United States Patent [19]

DeMeuse et al.

[11] Patent Number: 5,237,032

[45] Date of Patent: Aug. 17, 1993

[54] MICROWAVE PROCESSING OF CARBONATE MONOMERS

[75] Inventors: Mark T. DeMeuse, Robbinsville; Charles L. Ryan, Jr., Princeton Junction, both of N.J.; Fabrizio Parodi, Genoa, Italy

[73] Assignees: Istituto Guido Donegani S.p.A., Novara; Enichem S.p.A., Milan, both of Italy

[21] Appl. No.: 953,878

[22] Filed: Sep. 30, 1992

[51] Int. Cl.$^5$ .............................................. C08F 18/24
[52] U.S. Cl. ................................................... 526/314
[58] Field of Search ......................................... 526/314

[56] References Cited

U.S. PATENT DOCUMENTS

| | | |
|---|---|---|
| 3,432,413 | 3/1989 | Vanderhoff . |
| 4,508,656 | 4/1985 | Rinabi et al. . |
| 4,607,087 | 8/1986 | Moriya et al. .................. 526/227 |
| 4,623,705 | 11/1986 | Romano et al. . |
| 5,128,386 | 7/1992 | Rehmer et al. .................. 526/314 |

FOREIGN PATENT DOCUMENTS

| | | | |
|---|---|---|---|
| 0142118 | 5/1985 | European Pat. Off. | ............ 526/314 |
| 0227178 | 7/1987 | European Pat. Off. | ............ 526/314 |

OTHER PUBLICATIONS

*Polymer News*, (1991), 16, pp. 262–265, "The Chemistry and Processing of Polymeric Materials at Microwave Frequencies", M. T. Demeuse et al.

*Primary Examiner*—Joseph L. Schofer
*Assistant Examiner*—N. Sarofim
*Attorney, Agent, or Firm*—Oblon, Spivak, McClelland, Maier & Neustadt

[57] ABSTRACT

Carbonate monomers are polymerized in the presence or absence of a polymerization initiator by irradiation with electromagnetic radiation in the absence of solvent or diluent.

14 Claims, 4 Drawing Sheets

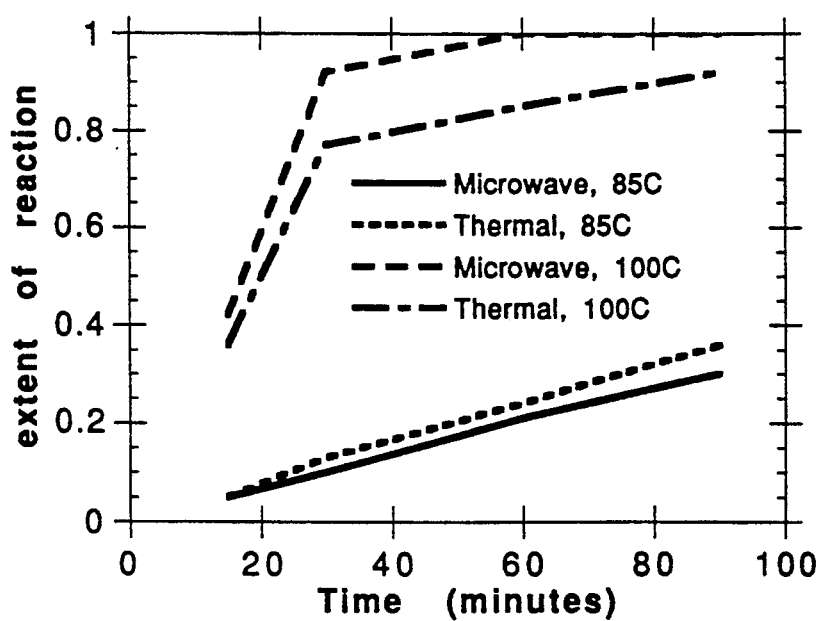

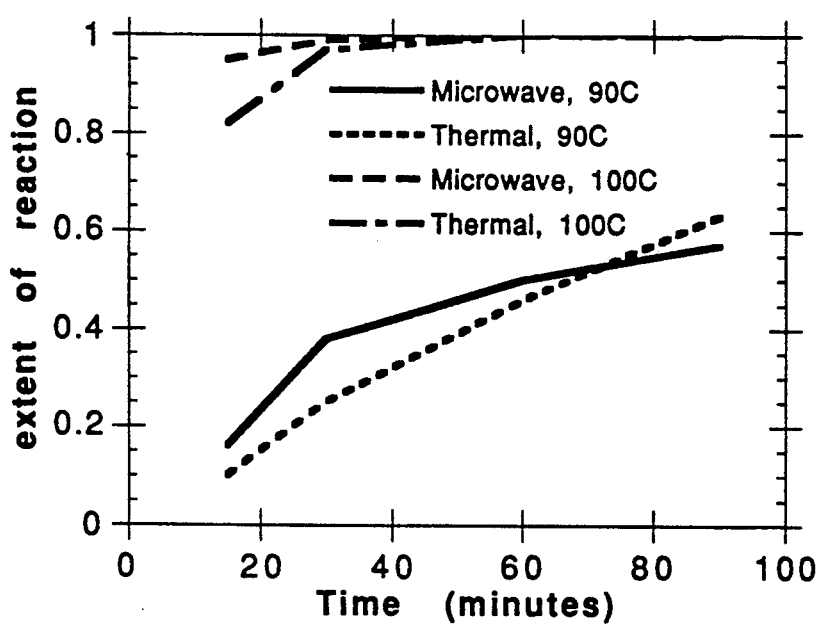

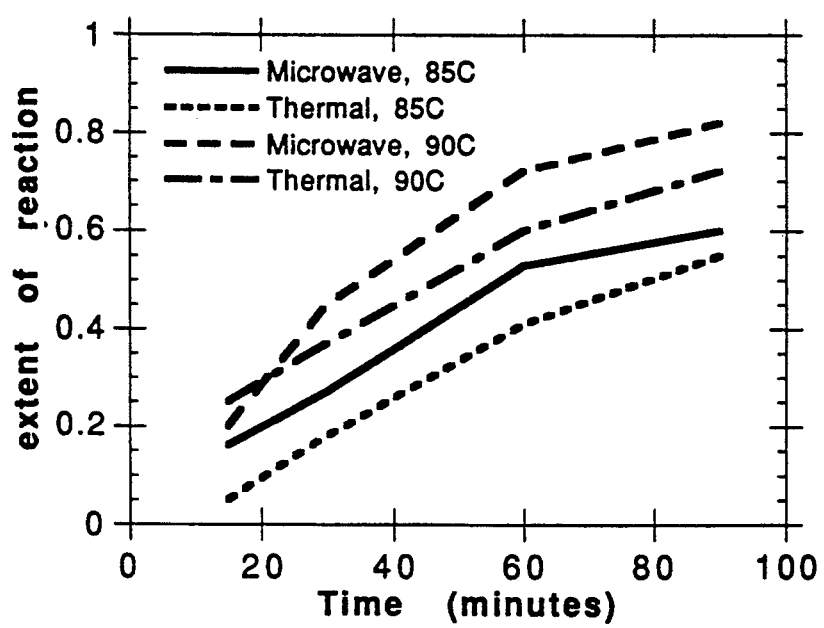

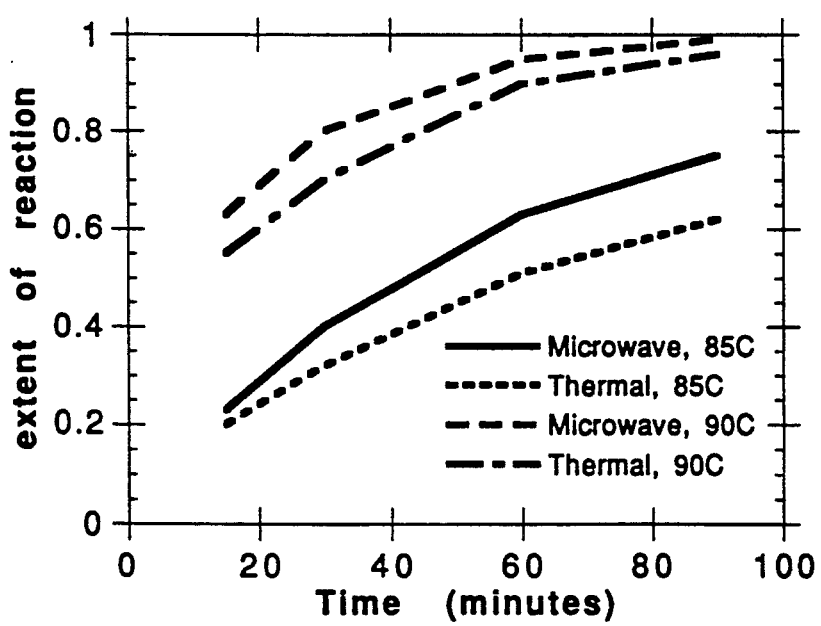

MICROWAVE PROCESSING OF CARBONATE MONOMERS

BACKGROUND OF THE INVENTION

1. Field of the Invention

The present invention relates to a method for curing carbonate monomers, e.g., diethylene glycol bis (allyl carbonate) using electromagnetic radiation.

2. Discussion of the Background

Diethylene glycol bis (allyl carbonate), (DADC), is a monomer which is widely used as an optical plastic for production lenses, safety glasses and guards, watch crystals, and instrument windows. The most common method of preparing DADC is by the reaction of diallyl carbonate and diethylene glycol in a relative molar ratio higher than about 10:1, in the presence of a basic catalyst, for example, as disclosed in U.S. Pat. No. 4,508,656 and U.S. Pat No. 4,623,705. This reaction scheme produces at least about 80–90% by weight pure DADC. If the ratio of diallyl carbonate to diethylene glycol is on the order of 2:1, an oligomer or a mixture of oligomers of diethylene glycol bis (allyl carbonate) is produced.

DADC, which has formula (I), polymerizes via a free radical mechanism using a suitable polymerization initiator to form a thermosetting polycarbonate. One of the most common initiators is benzoyl peroxide. The polymerization process involves a long initial curing cycle, typically at least 48 hours, at temperatures below 100° C. The initial curing is followed by a post-curing cycle at 110°–120° C. for several hours to destroy the unreacted catalyst as well release any stresses produced in the polymerization step. Above 100° C., benzoyl peroxide (BPO) cannot be used as an initiator because it decomposes too rapidly at these temperatures. Other initiators are available for polymerization at lower temperatures, as described in U.S. Pat. No. 4,607,087.

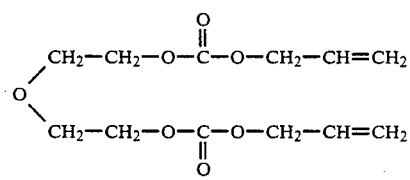

Polymerization of DADC results in a clear, colorless, abrasion-resistant polymer casting. The bulk polymerization is slow at first. With increasing conversion and upon gelation, polymerization is accelerated. The polymerization is highly exothermic. Thus, to prevent a runaway reaction with overheating and bubbling from occurring, especially in large pieces, a cooling system must be present. After the exothermic reaction, the rate of polymerization slows down.

Due to the slow reaction rate of the monomer, curing cycles on the order of 48–72 hours are used to obtain complete conversion of the monomer to polymer when using benzoyl peroxide as initiator. Even when using more reactive initiators, such as peroxydicarbonates, cycle times of 20 hours are commonly used. The long curing times which are associated with the above-mentioned conventional thermal curing methods for these materials limits their applications.

It is well known that high energy ionizing radiation, such as X-rays, electron beams from betatrons, cyclotrons, and other high energy electron sources or radiation from radioactive elements, such as cobalt 60, can cause chemical reactions. These reactions occur as a result of ionization which is induced in the reagents irradiated, and require energy on the order of several electron volts. At lower frequencies in the microwave range, the energy of the electromagnetic radiation is much too low to produce ionization and hence the chemical reactions that are obtained with ionizing radiation cannot generally be obtained with electromagnetic radiation in the radio-frequency and microwave range. Electromagnetic radiation in these frequency ranges, however, has been employed to create a heating effect in irradiated dielectric materials, e.g. dielectric heating and diathermy. The thermal effect caused by electromagnetic radiation in the radio-frequency and microwave range has also been utilized in chemical reactions which are activated by heating. In particular, the setting of adhesives or the curing of certain resin compositions may be accomplished through the dielectric heat caused by electromagnetic irradiation in this frequency range.

U.S. Pat. No. 3,432,413 discloses a method of initiating and conducting chemical reactions in a two-component system using non-ionizing radiation. Chemical reactions, in particular the polymerization of vinyl monomers, are conducted using pulsed non-ionizing electromagnetic radiation in the radio-frequency and microwave range to avoid substantial heating and undesired thermal effects.

According to U.S. Pat. No. 3,432,413, electromagnetic radiation in the radio-frequency and microwave range can initiate the polymerization of vinyl monomers without the use of chemical initiators only when a second component is present which is inert with respect to the monomer and to the polymerization, and which has a polarity different from that of the vinyl monomer. The required use of an inert diluent is expensive and has the disadvantage of requiring additional process steps to separate the diluent from the desired product.

A need continues to exist, therefore, for improved methods of producing polymers of carbonate monomers which do not have the limitations of existing methods.

SUMMARY OF THE INVENTION

Accordingly, one object of the present invention is to provide a method for polymerizing carbonate monomers efficiently using non-ionizing radiation.

This and other objects which will become apparent from the following specification have been achieved by the present process. In the process of the present invention, a carbonate monomer is polymerized, with or without an initiator using non-ionizing electromagnetic radiation in the microwave or radio-frequency range. This method allows for the polymerization of carbonate monomers in the absence of significant thermal effects. The monomer is used without solvent or diluent.

BRIEF DESCRIPTION OF THE DRAWINGS

FIG. 1 shows the extent of cure versus time curves for DADC containing 2 wt. % benzoyl peroxide initiator for both microwave and thermal (comparison) heating of the sample.

FIG. 2 shows the extent of cure versus time curves for DADC containing 3 wt. % benzoyl peroxide initiator for solutions heated by microwave and thermal (comparison) processes.

FIG. 3 shows the extent of cure versus time curves for DADC containing 4 wt. % benzoyl peroxide initiator heated by microwave and thermal (comparison) methods.

FIG. 4 shows the extent of cure versus time profiles for DADC containing 5 wt. % benzoyl peroxide heated by microwave and thermal (comparison) methods.

DETAILED DESCRIPTION OF THE PREFERRED EMBODIMENTS

It has now been found that carbonate monomers polymerize very efficiently using microwave or radio-frequency radiation and that the radiation heats a monomer sample to the desired reaction temperatures in a matter of seconds or minutes, depending on input power level, without the need of a second component. Further, the use of microwaves as the heating source allows reaction at an isothermal temperature to proceed at a faster rate than is possible using conventional thermal methods.

By "carbonate monomers" is meant monomers having two polymerizable terminal carbon-carbon double bonds available for polymerization and a carbonate group, preferably compounds having the general formula shown below.

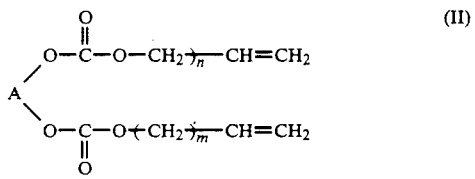

(II)

In this formula, A is a divalent (preferably hydrocarbon) organic group such as an alkylene, cycloalkylene, alkylene ether, arylene, aralkylene or arylene group. Preferably, A is $C_{2-10}$alkylene or cycloalkylene (more preferably $C_{2-6}$alkylene or cycloalkylene), $C_{2-8}$alkylene ether (more preferably $C_{2-5}$alkylene ether), $C_{6-10}$arylene, $C_{7-12}$aralkylene or arylene-B-arylene, where the arylene groups are as defined above and B is a straight-chain or branched $C_{1-6}$alkylene group (more preferably $C_{1-4}$alkylene group). Group A may be substituted with one or more (preferably 1-3) $C_{1-4}$alkyl groups. In formula (II), n and m are independently integers of 1-5. Preferably, n=m=1-3.

The carbonate monomers of formula (II) are prepared by heating diallyl carbonate, $CH_2=CH(CH_2)_n-O-C(O)-O-(CH_2)_mCH=CH_2$ where n=m=1 or a homologue thereof where one of n and m is 2-5, with an appropriate diol or glycol having the formula HO—A—OH, where A is as defined above. The carbonate monomers may be prepared in the presence of a base catalyst according to the method described in U.S. Pat. No. 4,508,656 and U.S. Pat. No. 4,623,705, incorporated herein by reference.

Specific examples of alkylene or cycloalkylene diols which can be used to prepare the carbonate monomers include ethylene glycol, 1,3-propanediol, 1,4-butanediol, 1,6-hexanediol and cyclohexane dimethanol. Suitable alkylene ether diols include diethylene glycol, triethylene glycol, tetraethylene glycol, dipropylene glycol, etc. Specific arylene glycols include hydroquinone, resorcinol, 2,5-naphthalenediol and 2,6-naphthalenediol. Specific arylene-B-arylene diols include 2,2-bis(p-hydroxyphenyl)propane (bisphenol A). A particularly preferred monomer is DADC. For simplicity, the carbonate monomer will be referred to below as simply the "monomer".

The present invention is applicable to carbonate monomers, oligomers of the same, or any mixture which contains the same.

In accordance with the present invention, the carbonate monomer is polymerized, in the presence or absence of suitable polymerization initiators, by subjecting it to pulsed or continuous electromagnetic radiation. The electromagnetic radiation causes dielectric heating of the monomer. Accordingly, the pulse duration and frequency are adjusted to avoid significant thermal effects.

The frequency of the electromagnetic radiation used in the present invention is in the microwave and radio frequency range and varies from $10^8$ to $10^{11}$ Hertz (Hz). The input power necessary to heat and react the monomer is dependent on the final desired result. The initial heating rate can be controlled by monitoring and varying the input power into the sample. In general, the power is such that under pulsed or continuous radiation, dielectric heating will result. The preferred output power is up to about 1-2 kilowatts.

When using pulsed radiation, any arrangement of pulse duration and pulse repetition frequency which allows for the dissipation of adverse heat build-up in the reaction mixture may be used in the present invention. The pulse duration may be varied from 1 to 100 microseconds and the pulse repetition frequency from 2 to 1,000 pulses per second. The mixture of monomer and initiator may be irradiated for any period of time sufficient to achieve polymerization. Generally, a sample will be irradiated for at least about 5 minutes, commonly for a period of time ranging from about 10 minutes to about 150 minutes to achieve the desired extent of polymerization. Obviously, the time required to achieve polymerization will be shorter for higher power settings. The amount of time, frequency and power ranges can be readily adjusted by one having ordinary skill in the art to achieve the desired extent of polymerization based on simple calibration experiments.

When continuous radiation is utilized, the sample is also heated for a time sufficient to achieve the desired polymerization, generally at least about 5 minutes, preferably about 10-150 minutes. As with pulsed radiation, the time, frequency and power input can be routinely adjusted to achieve the desired extent of polymerization.

Irradiation of the monomer sample may be conducted in any microwave and/or radio frequency heating device which is capable of continuous or pulse radiation and has the power requirements necessary to polymerize the sample. Suitable heating devices include microwave ovens, waveguides, resonant cavities, etc. Suitable heating devices are well known in the art and commercially available.

The preferred device for performance of the present invention is a single-mode resonant cavity. Any available mode for heating in this device can be used in the present invention. However, the present invention is not be limited to use of this device but can be performed in any microwave or radio-frequency heating equipment.

In general, the process of the present invention is carried out by placing the monomer/initiator inside of a microwave or radio frequency device and applying the appropriate input power. The present invention is particularly suitable for batch processing but is not be limited in this regard. The microwave reactions are generally carried out at elevated temperatures, as required by the decomposition half-lives of the polymerization initiators.

The polymerization reaction is preferably carried out in the presence of a polymerization initiator. Suitable initiators are known in the art and any initiator which is capable of initiating polymerization of the monomer may be used. Preferably, the initiator is chosen from the following types of compounds:

(a) Organic peroxyesters, preferably $C_{4-30}$ alkyl or $C_{6-30}$ aryl peroxyesters such as tert-butyl peroxymaleate, tert-butyl peroxylaurate, tert-butyl peroxy 3,5,5-trimethylhexanoate, 2,5-dimethyl-2,5-di(benzoyl peroxy)hexane, tert-butyl peroxyacetate, tert-butyl peroxybenzoate, tert-butyl peroxyisophthalate, cumyl peroxyneodecanoate, tert-butyl peroxyneodecanoate, tert-butyl peroxypivalate, tert-butyl peroxy(2-ethylhexanoate), and tert-butyl peroxyisobutyrate.

(b) Organic peroxydicarbonates, preferably $C_{6-30}$ peroxydicarbonates such as di-isopropyl peroxydicarbonate, di-n-propyl peroxydicarbonate, di-myristyl peroxydicarbonate, di-(2-ethoxyethyl) peroxydicarbonate, di(methoxyisopropyl)peroxydicarbonate, di-(2-ethylhexyl) peroxydicarbonate, and di-(3-methyl-3-methoxybutyl) peroxydicarbonate.

(c) Diacyl peroxides, preferably $C_{4-30}$ alkyl or $C_{6-30}$ aryl diacyl peroxides such as 3,5,5-trimethylhexanoyl peroxide, octanoyl peroxide, decanoyl peroxide, lauroyl peroxide, acetyl peroxide, meta-toluyl peroxide and benzoyl peroxide.

(d) Peroxycarbonates, preferably $C_{4-30}$ peroxycarbonates such as tert-butyl peroxyisopropylcarbonate.

(e) Peroxyketals, preferably $C_{6-30}$ alkyl or cycloalkyl peroxyketals such as 1,1-bis(tert-butyl peroxy)-3,3,5-trimethylcyclohexane,' 1-1-bis(tert-butyl peroxy)cyclohexane, and 2,2-bis(tert-butyl-4,4-bis(tert-butyl peroxy)valerate.

(f) Ketone peroxides, preferably $C_{4-20}$ ketone peroxides such as cyclohexanone peroxide and methyl ethyl ketone peroxide.

A particularly preferred initiator is benzoyl peroxide.

Such initiators are employed at a concentration, with respect to the monomer, which generally varies from 0.01 to about 10% by weight, preferably about 1-5%. The monomer and initiator are mixed together in the appropriate proportions by weight in the same vessel and the entire mixture is placed into the microwave device.

Other features of the invention will become apparent in the course of the following descriptions of exemplary embodiments which are given for illustration of the invention and are not intended to be limiting thereof.

EXAMPLES

Example 1

Samples of DADC containing 3% benzoyl peroxide were placed in TEFLON containers and heated to 90° C. using both a single-mode resonant cavity and a conventional thermal oven. Input power for the microwave experiments was 5 watts of power. Heating time for the microwave experiments was 90 seconds while for the thermal experiments was 400 seconds.

DADC alone was placed in a TEFLON container and heated to 90° C. in a single-mode resonant cavity using an input power of 20 watts. Total heating time was 30 seconds.

Samples containing 2%, 3%, 4% and 5% benzoyl peroxide by weight were made with DADC monomer at room temperature. This temperature was used to ensure that the sample did not begin to react upon mixing. The compositions thus obtained were poured into small TEFLON cylinders which were used to cure the samples.

Microwave curing of DADC was conducted in a six inch diameter single-mode resonant cavity. The microwave source had an operating frequency of 2.45 GHz which was produced by an OPTHOS microwave generator that had a maximum power output of 40 watts.

Samples were placed in the cavity so that the $TM_{012}$ mode was utilized. The $TM_{012}$ mode produces an axial electromagnetic field. The sample temperature was monitored by a LUXTRON fluoroptic probe. The probe was placed in the cylinder with the sample and protected by a glass probe cover. Isothermal microwave curing was performed in the temperature range of 85° to 100° C. for times up to 90 minutes. This temperature range corresponds to the usual use temperature range for benzoyl peroxide. The same time and temperature ranges were used for thermal curing experiments which were done using a circulating air oven. After both the microwave and thermal cure, the reacted samples were quenched with dry ice to prevent further reaction. Differential Scanning oalorimetry (DSC) was used to measure the extent of cure of the samples. All measurements were run in a nitrogen atmosphere using a heating rate of 10° C./min.

The extent of cure, x, is calculated according to the equation:

$$x = 1 - \frac{Hr}{Hp} \qquad (1)$$

where Hr is the residual heat of the partially cured sample and Hp is the heat of polymerization of the uncured sample. Hp was determined to be 525 J/g by DSC examination of an uncured sample.

FIGS. 1–4 compare the extent of cure versus time profiles for DADC solutions containing 2, 3, 4 and 5 wt. % benzoyl peroxide. These figures show that using microwaves as the heating source allows the same extent of reaction to be obtained in a shorter time, compared to conventional thermal heating. As an example, for the 3% benzoyl peroxide solution, at 90° C. it takes about 15 minutes to reach an extent of cure of 0.2 while at the same temperature under thermal conditions it takes about 30 minutes to reach this level of cure. In general, the reduction in reaction time corresponds to about a 2-3 fold time reduction. This effect is most pronounced for the solutions which contain 4–5 weight benzoyl peroxide but there is still an effect for the lower benzoyl peroxide levels.

Example 2

Samples of the monomer having the structure shown below

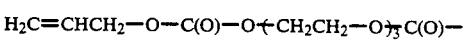

and containing 2%, 3%, 4% and 5% by weight benzoyl peroxide are placed into small TEFLON cylinders and cured in a six-inch diameter single-mode resonant cavity in a manner described in Example 1. The cured samples are quenched to provide the cured polymer.

Example 3

Samples of the monomer having the structure shown below

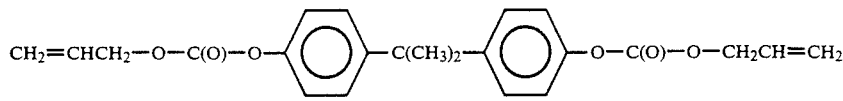

and containing 2%, 3%, 4% and 5% by weight benzoyl peroxide are placed into small TEFLON cylinders and cured in a six-inch diameter single-mode resonant cavity in a manner described in Example 1. The cured samples are quenched to provide the cured polymer.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for polymerizing a carbonate monomer containing two terminal carbon-carbon double bonds and a carbonate group, which comprises irradiating said monomer in the absence of solvent or diluent with pulsed or continuous, microwave or radio frequency electromagnetic radiation.

2. The process of claim 1, wherein said carbonate monomer is irradiated in the presence of a polymerization initiator.

3. The process of claim 2, wherein said initiator is selected from the group consisting of organic peroxyesters, organic peroxydicarbonates, diacyl peroxides, peroxycarbonates, peroxyketals and ketone peroxides.

4. The process of claim 2, wherein said initiator is present at a concentration of from 0.01 to about 10 wt % relative to said monomer.

5. The process of claim 4, wherein said initiator is present at a concentration of about 1-5 wt % with respect to said monomer.

6. The process of claim 1, wherein said radiation has a frequency range from $10^8$ to $10^{11}$ Hz.

7. The process of claim 2, wherein the initiator is benzoyl peroxide.

8. The process of claim 1, wherein said carbonate monomer has the formula shown below

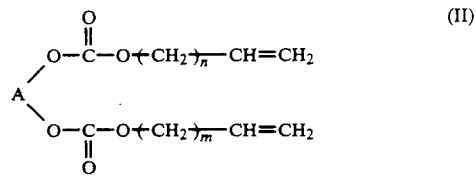

wherein A is a divalent organic group, n and m are independently integers from 1-5.

9. The process of claim 8, wherein A is an alkylene, cycloalkylene, alkylene ether, arylene, aralkylene or arylene group.

10. The process of claim 8, wherein A is selected from the group consisting of $C_{2-10}$alkylene, $C_{2-10}$cycloalkylene, $C_{2-8}$alkylene ether, $C_{6-10}$arylene, $C_{7-12}$aralkylene and $C_{6-10}$arylene-B-$C_{6-10}$arylene groups, where B is a straight-chain or branched $C_{1-6}$alkylene group.

11. The process of claim 10, wherein group A is substituted with one or more $C_{1-4}$alkyl groups.

12. The process of claim 1, wherein said carbonate monomer is ethylene glycol bis(allyl carbonate).

13. A process for polymerizing a carbonate monomer containing two terminal carbon-carbon double bonds and a carbonate group, which consists of irradiating said monomer in the absence of solvent, diluent and chemical polymerization initiator, with pulsed or continuous, microwave or radio-frequency electromagnetic radiation.

14. The process of claim 13, wherein said radiation has a frequency range from $10^8$ to $10^{11}$ hz.

* * * * *